United States Patent [19]

Post

[11] 4,389,602
[45] Jun. 21, 1983

[54] ELECTRIC MOTOR CONTROLLER

[75] Inventor: Stephen F. Post, Pleasant Hill, Calif.

[73] Assignee: William M. Brobeck & Associates, Berkeley, Calif.

[21] Appl. No.: 236,231

[22] Filed: Feb. 20, 1981

[51] Int. Cl.³ .............................................. H02P 7/28
[52] U.S. Cl. .................................................... 318/341
[58] Field of Search ............................ 318/341, 345 B

[56] References Cited

U.S. PATENT DOCUMENTS

| | | | |
|---|---|---|---|
| 3,465,227 | 9/1969 | Ivie et al. | 318/345 B |
| 3,950,681 | 4/1976 | Kern | 318/341 X |
| 4,217,526 | 8/1980 | Farr | 318/341 X |
| 4,218,730 | 8/1980 | Marumoto et al. | 318/345 B X |

Primary Examiner—J. V. Truhe
Assistant Examiner—W. E. Duncanson, Jr.
Attorney, Agent, or Firm—Robert G. Slick

[57] ABSTRACT

An electronic controller for DC motors is provided which is particularly adapted for use on electric vehicles. The controller is of the pulse-width type wherein a chopper is employed to divide the current into a series of pulses and the output of the controller is regulated by the width of the pulses. A number of protective devices are built into the circuit, including an active current limiter, a main current limiter and a back-up limiter whereby it is virtually impossible to damage the individual components.

7 Claims, 2 Drawing Figures

ELECTRIC MOTOR CONTROLLER

SUMMARY OF THE INVENTION

Pulse-width motor controllers are well-known but suffer from a number of defects.

Some of the controllers require high power transistors which are very expensive. Other controllers have used SCRs which are capable of handling high currents but which have a relatively slow response time. These defects in the prior art devices have been remedied in the present invention by the employment of a plurality of parallel transistors which are relatively low in cost.

When using parallel transistors it has ordinarily been necessary to match up the parallel transistors to equalize current flow through the transistors. This is difficult to achieve in practice and is obviated in the present invention by employing an active current limiter for each of the individual output devices so that it is not necessary to provide any ballast or equalizing network between the various transistors.

Another feature of the invention is that it provides a main current limiting device which is ordinarily operative to limit the output to a safe value. This is provided with a back-up circuit so that should some of the output devices fail, the current through the remaining individual devices would be maintained at a safe level.

A further safety device incorporated into the present invention prevents the motor from starting abruptly even if the ignition switch is turned on while the acceleration pedal is in a depressed condition.

Another advantage of the present invention is that it provides for regeneration so that the battery is actually charged under some conditions while a vehicle is coasting.

Thus, the present invention provides a fully protected and reliable controller for electric vehicles utilizing pulse width modulation whereby the power of the motor is controlled by varying the pulse width from 0 to 100 percent. As will be later brought out in detail, the controller of the present invention is suitable for use with series, shunt and compound as well as permanent magnet motors.

The pulse-width controller of the present invention acts like a DC transformer to cause the input/output current ratio to be inversely proportional to the voltage ratio. Thus, it can supply high motor current for acceleration with low battery current by taking advantage of the ratio of motor to battery voltage.

Various other features and advantages of the present invention will be brought in a detailed description which follows.

DESCRIPTION OF THE PREFERRED EMBODIMENTS

Figure 1A:
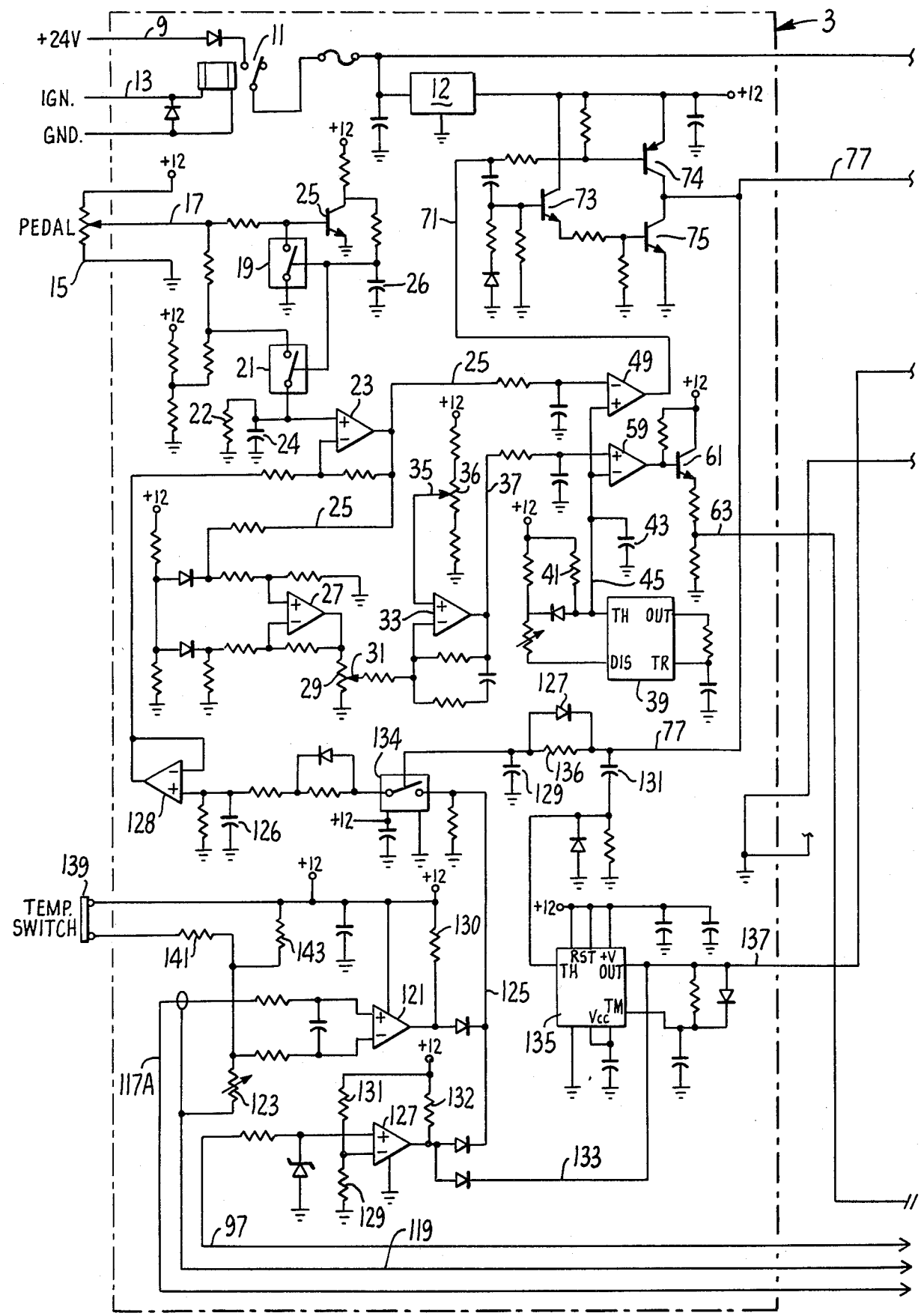
FIGS. 1A and 1B are a schematic diagram of a preferred embodiment of the present invention.
Figure 1B:
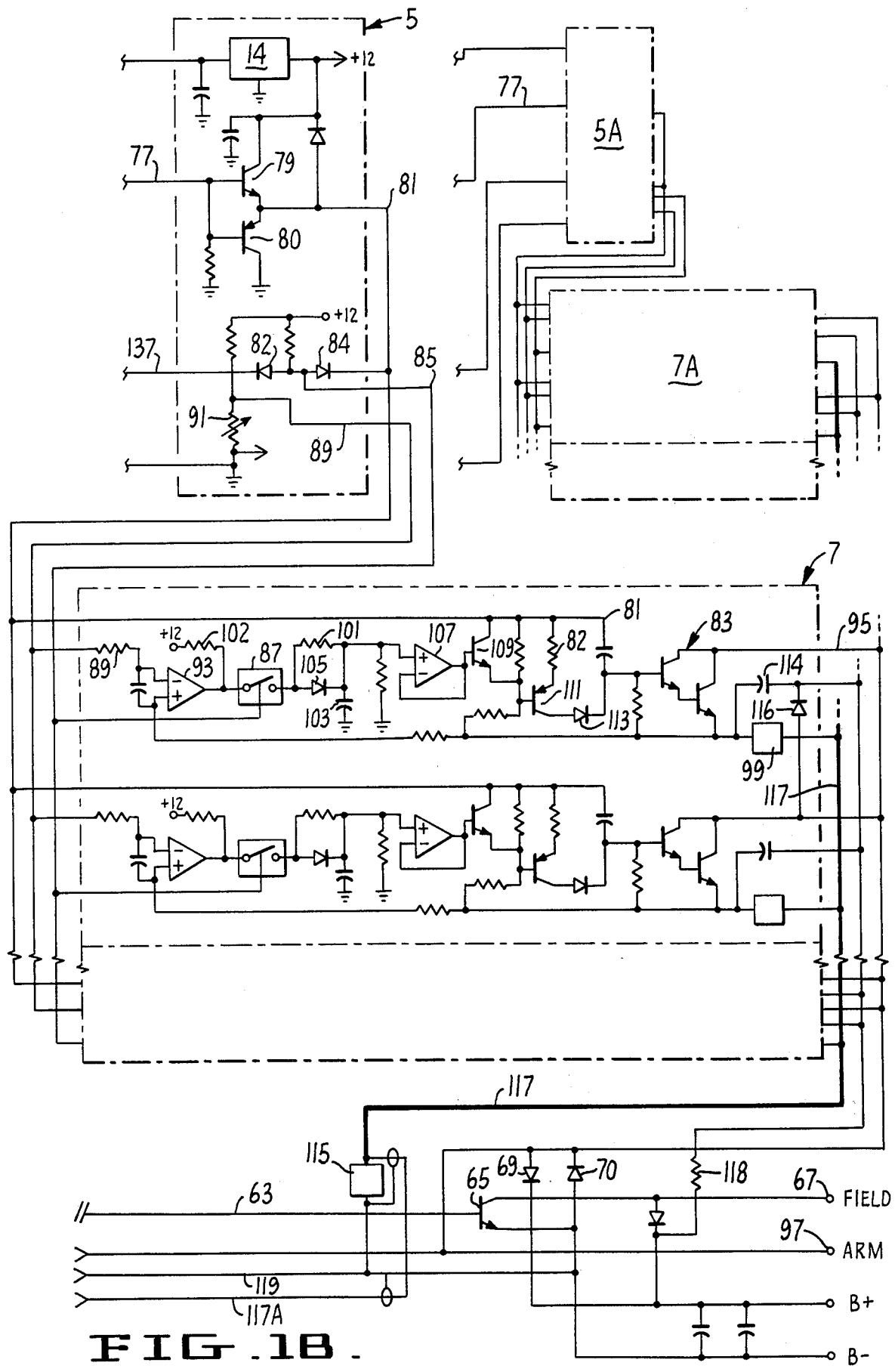

Referring now to the drawings by reference characters, the circuit includes a logic board generally designated 3, a plurality of current limit boards generally designated 5 and a plurality of drive circuits generally designated 7. In a preferred embodiment of the invention, two current limit boards are employed and each of the limit boards fans out to four circuit boards, only two being illustrated on the board generally designated 7. It will be understood, of course, that the boards shown in phantom are parallel to and equivalent to the boards shown in solid lines. Thus, board 5A is identical to board 5 while board 7A is equivalent to board 7. Of course, this illustrates only a preferred embodiment of the present invention and other numbers of current limit boards and paralleled output boards could be employed without departing from the spirit of the invention.

Power to actuate the boards is supplied from a 24 volt source 9 and is turned on and off by relay 11 which is actuated by an ignition line 13. Individual voltage regulators 12 and 14 supply a regulated voltage to the logic and current limit boards. A pedal potentiometer 15 is employed with its wiper arm 17 connected to the electronic switches 19 and 21 to the non-inverting input of operational amplifier (hereafter OpAmp) 23. Transistor 25 acts as a safety device so that should the ignition switch be turned on while the pedal is depressed, the non-inverting input of 23 remains at ground level, preventing any abrupt starting of the motor. When the pedal is released, capacitor 26 charges, restoring the controller to normal operating condition. The pedal signal is taken through line 25 to OpAmp 27. Resistor 22 and capacitor 24 serve as a damper to avoid mechanical resonances. The output from 27 goes to potentiometer 29 the purpose of which is to set the minimum field level, as is later described in detail, the output being taken from wiper 31 and connected to the inverting input of OpAmp 33 while the non-inverting input to 33 is taken from the wiper 35 on a voltage divider 36 and this sets the maximum field as is later described in detail. Thus, the maximum and minimum field currents are established and the output is taken through line 37 and utilized as later explained.

The ramp generator itself is designated 39 and in a practical embodiment of the invention consists of one-half of a 556 timer. The frequency of the timer is determined by the time constant of resistor 41 and capacitor 43. In a practical embodiment of the invention the frequency was about 4 kHz although this frequency is not at all critical. This circuit produces a sawtooth wave which appears on line 45 and is applied to the non-inverting input of comparator 49 and the inverting input of comparator 59. Since this output is in the form of a sawtooth wave, and is compared with a reference level, the output from the comparators is in the form of a series of pulses, the space between the pulses depending upon the height of the two reference levels. The output from comparator 59 drives transistor 61 in an emitter follower configuration, the pulses being taken through line 63 to field current output transistor 65 and to the field output terminal 67.

The components for the field drive are so selected that when the pedal is first depressed, maximum field current is provided from 0 to 65 percent of the pedal travel. From 65 to 100 percent of pedal travel, the field current drops to a present minimum value as determined by the position of wiper 31.

Speed control in the 0–65 percent pedal travel is accomplished, as is later described, by varying the armature voltage and after the full armature voltage is applied to the motor, at about 70 percent pedal travel, further speed control is achieved by lowering the voltage applied to the field. Field voltage is linearly reduced as the pedal is depressed from 65–100 percent. This weakening of the motors field causes the motor's speed to increase above its "base" or full-field speed.

When the motor is operating above its base speed, typically during downhill runs or during downshifting, diode 70, characterized as a regeneration diode, allows current to flow back and charge the battery.

In many instances, the controller of the present invention is utilized with a series wound motor or permanent magnet motor in which case the field circuit previously described does not operate and the motor control is achieved completely through the armature circuit.

In comparator 49, the sawtooth wave, previously described, from line 25, is applied to the non-inverting input. The pedal level signal is applied to the inverting input of comparator 49 to produce pulses in line 71 which drives output transistor 74 to produce pulses in line 74. Transistors 73 and 75 cause a sharp decay in the trailing edge of the pulses. The sharply divided pulses are supplied through line 77 to the current limiting boards 5 and 5A. The pulses are amplified by transistors 79 and 80 and passed through line 81 to resistor 82, transistor 111 and diode 113 and then to the base of the first transistor in the Darlington pair 83 which constitute the output transistors. At the same time the pulse is taken through line 85 to actuate the electronic switch 87. Diodes 82 and 84 act as an OR gate and if either input is low it keeps gate 87 open to prevent noise during switching. The function of line 137 on the OR gate is later explained. Thus, there is a slight delay in closing switch 87 so that the circuit is activated only during current flow conditions. A reference level is established in line 89 by means of the variable resistor 91 and this is applied to the inverting input of comparator 93. The output from the Darlington pair 83 is taken from the collector output 95 and becomes the armature output at 97. Emitter bus 117 is very heavy and a very low value resistor (e.g. $0.001\Omega$) 99 is in the emitter lead of the Darlington pair so that there is a small voltage drop across this resistor. The emitter voltage drop is applied to the non-inverting input of comparator 93 and the output of the comparator is integrated by means of the resistors 101, 102 and capacitor 103. Diode 105 provides for a fast attack slow decay circuit. The integrated output is amplified by OpAmp 107 and passed through transistors 109 and 111. In the event an over-current situation sensed by resistor 99, the drive applied to the base of the first of the Darlington pair 83 is reduced. Diode 113 is an anti-feedback protection device so that a collector to base short in one output device will not affect the other devices. A small, low inductance capacitor 114 on each output device connected in series with a small, high-speed diode 116 serves to trap internally generated inductive spikes. The small capacitors are kept discharged to B+ level by a resistor 118 whose time constant is appropriately chosen. The small, high-speed diodes add little to the turn-on load of the output device and also take over the current at turn-off before the main freewheel diode 69 begins conduction. This constitutes the active current limiter to protect the individual paralleled output transistors. Thus, one limiter is provided for each Darlington pair.

In addition, a main current limiter is provided so that the current of all of the paralleled output transistors cannot exceed a preset value. It was previously described as to how there is a shunt resistor in the emitter line (e.g. 99) to each of the Darlington pairs. In addition, there is a very low value resistor (0.0002 $\Omega$) 115 in the main emitter bus 117. The voltage drop across resistor 115 is sensed in line 119 and passed to the non-inverting input of comparator 121. The inverting input is connected to line 117A and a variable resistor 123 in line 119 is adjusted so that if there is an unsafe condition, i.e. the current through line 117 is excessive, it will cause line 125 to go positive; this positive output voltage goes through switch 134 and is integrated by capacitor 126 and applied to OpAmp 128. The output of 128 is applied to the inverting input of OpAmp 23, thus reducing the reference level applied to 49 and in turn the armature current by the route previously described.

This limiting action is satisfactory so long as all of the output transistors are operating but, if several of the transistors failed or if a wire broke or the like, the total operating current would not be excessive yet an unsafe condition would exist. Thus, there is a back-up limiter so that even if the main current limiter is not actuated, the back-up limiter will take over in the event of an unsafe condition. This is done by sensing the emitter-collector voltage of the Darlington pairs through line 97 which is fed to the non-inverting input of comparator 127 while the inverting input is tied to a reference level voltage from the divider made up of resistors 129 and 131. In the event that an over-current is sensed, line 125 will go positive and reduce drive as previously described.

Resistor 130 has a much higher value than resistor 132, so that the back up limiter has a faster response time than the main limiter.

Timer 135 (the other half of the 556) is connected as a one shot multi-vibrator and is triggered by pulses from line 77 through capacitor 131. The output from line 137 acts as a disable signal through the OR gate made up of diodes 82 and 84 to prevent switch 87 from closing. In addition, line 133 is connected through diodes to line 125 and serves to disable the circuits previously described during off and noise periods.

Switch 134 is also actuated by armature pulses in line 77 and a slight delay is provided by capacitor 129 and resistor 136.

A further protective device is provided by the temperature switch 139 which opens if an excessive temperature is sensed. Resistors 141 and 143 are in parallel when this switch is closed but when the switch opens, resistor 141 is removed from the circuit, so that the high resistance of 143 which forms a voltage divider with the variable resistor 123, changes the reference level on the inverting input of comparator 121, thus reducing the drive to the output transistors. When a safe condition returns and the temperature switch closes, the controller is restored to full output.

Although the output transistors have been described as Darlington pairs, single high speed switching transistors might be employed.

In use, the main traction battery is connected between B+ and B−. In the case of a series or permanent magnet motor, the motor leads are connected between B+ and 97. Line 67 is not connected. In the case of a shunt or compound wound motor, the field is connected between 67 and B+ while the armature is connected between 97 and B+.

In a practical embodiment of the invention, 8 pairs of SDT 96306 high-speed switching transistors were employed and the traction battery voltage was 96. The maximum current was 400A.

Although a specific embodiment of the invention has been described, it will be obvious to those skilled in the art that many departures can be made from this specific embodiment without departing from the spirit of this invention.

The subject matter to be claimed is:

1. In a motor controller for a direct current motor, said controller having a chopper for generating a series of pulses and pulse-width controlling means whereby the off time between pulses can be controlled, said chopper generating a signal to control a plurality of parallel output transistors the improvement comprising current limit means for each of said output transistors, said current limit means including a low value resistor in the emitter leg of each individual transistor and means for sensing the voltage drop across each said individual resistor and reducing the drive to that particular transistor if said voltage drop exceeds a certain predetermined value.

2. The controller of claim 1 wherein the output transistor consists of a Darlington pair.

3. The controller of claim 1 wherein said parallel transistors have a common emitter bus and having a low value resistor in said common bus and means to reduce pulse width to all of said transistors if the voltage drop across said low value resistor exceeds a certain predetermined value.

4. The controller of claim 3 having a back-up limiter, said back-up limiter having sampling means to sample the collector-to-emitter voltage and means to reduce pulse width if said voltage does not go below a predetermined value.

5. The motor controller of claim 1 having in addition an on-off circuit to activate the electronics of said controller and a pedal input to increase the pulse on-time of said controller as said pedal is depressed and means for deactivating said controller if said on-off switch is turned "on" while said pedal is depressed.

6. The controller of claim 1 having a small low inductance capacitor and a high speed diode across the emitter-to-collector of the output transistors to trap internally generated inductive voltage spikes.

7. In a motor controller for a direct current motor, said controller having a chopper for generating a series of pulses and pulse-width controlling means whereby the off time between pulses can be controlled, said chopper generating a signal to control a plurality of parallel output transistors the improvement comprising current limit means for each of said output transistors, said current limit means including a low value resistor in the emitter leg of each transistor and means for sensing the voltage drop across said resistor and reducing the drive to said transistor if said voltage drop exceeds a certain predetermined value, said controller having a field output and an armature output and pedal means to control said outputs whereby maximum field current is provided from 0 to 65% of pedal travel and field current decreases from 65 to 100% of pedal travel and armature output increases from zero to its maximum valve at about 70% and remains constant from 70 to 100% of pedal travel.

* * * * *